United States Patent [19]
Kenny et al.

[11] 3,856,045
[45] Dec. 24, 1974

[54] VACUUM CONTROL VALVE

[75] Inventors: Andrew Augustine Kenny, Roselle; Richard Kendall Larson, Streamwood; Donald Frank Janous, Chicago, all of Ill.

[73] Assignee: Eaton Corporation, Cleveland, Ohio

[22] Filed: Mar. 8, 1973

[21] Appl. No.: 339,262

[52] U.S. Cl... 137/625.11, 137/624.18, 137/625.19, 137/625.46, 251/297
[51] Int. Cl............................................. F16k 11/14
[58] Field of Search.......... 137/560, 624.11, 624.18, 137/625, 625.11, 625.46, 625.18, 625.19; 200/61.86

[56] References Cited
UNITED STATES PATENTS

| | | | |
|---|---|---|---|
| 2,961,833 | 11/1960 | Schwartz............................ | 137/625 |
| 3,074,431 | 1/1963 | Schwartz et al. ............... | 137/625.46 |
| 3,122,616 | 2/1964 | Rice et al....................... | 137/625.46 |
| 3,237,644 | 3/1966 | Beck et al...................... | 137/624.18 |
| 3,561,486 | 2/1971 | Beck et al...................... | 137/624.18 |
| 3,637,962 | 1/1972 | Fiddler et al. ................. | 200/61.86 |

*Primary Examiner*—William R. Cline
*Attorney, Agent, or Firm*—Teagno & Toddy

[57] ABSTRACT

An improved vacuum control valve sequentially porting vacuum to control selected accessories such as those used in temperature control systems in automotive vehicles and the like. The control valve includes a valve body having a plurality of vacuum inlets and outlets, each of which leads to a separate opening in a flat face in the body, a diverter track abutting the flat face. The diverter track includes a plurality of contiguous circumferentially extending and radially extending molded bead surfaces which form sealed and vented channelled diverter passageways juxtaposed the vacuum openings. Especially configured radially extending bead surfaces prevent leakage from the vacuum openings upon rotation of the track to divert vacuum from one passageway to another.

10 Claims, 8 Drawing Figures

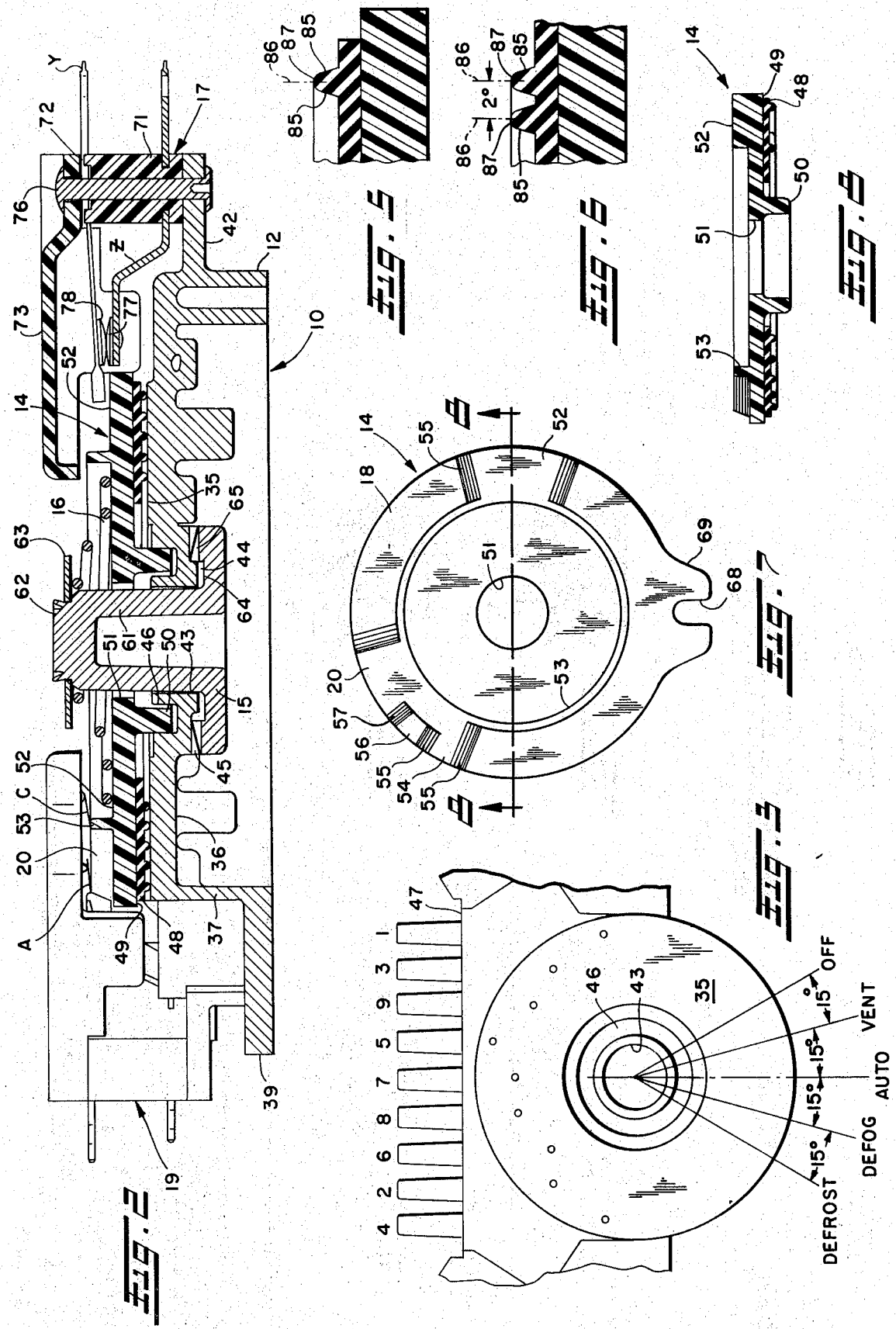

VACUUM CONTROL VALVE

This invention relates to a control valve and more particularly to a control valve of the diverter type employing positive means of pressure sealing therein.

The invention is particularly applicable to and will be described with particular reference to an automatic temperature control system regulating the temperature in the passenger compartment of a vehicle wherein a control valve diverts vacuum to selective vacuum operated accessories while simultaneously controlling electrical functions associated with such accessories. However, it will be appreciated that the invention may have broader applications and may be used in any application where pressure, positive or negative, is ported from one device to another.

Vacuum control valves are known in the art and reference may be had to U.S. Pat. No. 2,961,833 to S. H. Schwartz for an illustration of such a valve. Briefly, such control valves comprise a body having a generally flat face and a plurality of openings therein, each opening communicating with associated vacuum inlets and outlets. Abutting the flat face is a diverter track having channelled passageways formed from molded bead surfaces which passageways serve to port vacuum from one outlet to another as the diverter track is rotated.

Heretofore leakage would result when an end of a channelled passageway in the diverter track straddled an opening or was closely adjacent an opening which frequently occurred if the actuating lever of the control valve was inadvertently placed between one of its selected positions. In an attempt to reduce leakage, smaller sized holes typically 0.026 inch in diameter, were drilled and then deburred in the flat face of the valve body. This costly operation only reduced the travel range over which leakage would occur. Importantly, because of the close relationship between holes and channelled passageway ends, which must be maintained because of size limitations, travel requirements, etc., leakage would still occur if the operating lever of the control valve was slightly displaced from one of its selected positions.

Leakage would also occur when foreign matter became entrapped in the lubricating oil used between the diverter track and the valve body. Such foreign matter thus became abrasive particles which wear away end passageway bead surfaces as such surfaces wipe the lubricant from the valve body when the diverter track rotates. In time the bead surfaces become pitted and leakage occurred constantly.

Additionally, in control valves employed in automatic temperature control systems which require a number of channelled diverter passageways resulting in a relatively large diameter diverter track and valve body, leakage occurs because the diverter track cannot be maintained in sealing engagement with all its passageways about its periphery. This occurs because the majority of the inlet and outlet openings are adjacent one end of the diverter track which result in a high bead density at that end of the track and a low bead density at the opposite end. Thus the diverter track tends to seal at its high density portion and leak at its low density portion because of non-uniform bearing area and the condition is aggravated when the operating means of the control valve exerts a force on the track which tends to tip or cock same.

It is thus a principal object of the subject invention to provide a positive sealing bead arrangement in a diverter track of a control valve which overcomes all of the above-noted deficiencies while also improving the life thereof.

In accordance with the invention this object is achieved by providing a control valve essentially comprising a valve body having a generally flat surface through which extends a plurality of vacuum inlet and outlet openings and a diverter track having a generally flat end face abutting the valve body's flat surface. The end face of the diverter track has a plurality of channelled diverter passageways therein, each passageway comprising contiguous radially extending bead surfaces defining channelled passageway ends and circumferentially extending bead surfaces. Certain passageway ends are defined by especially configured, double-radial bead surfaces which prevent leakage when the passageway ends are straddling an inlet or outlet opening or adjacent an inlet or outlet opening as the opening thus ported may leak through one of said radial beads but not both. Additionally, a uniformly distributed bead surface area promoting good sealing characteristics is provided by discontinuous radially extending bead surfaces in those passageways extending over a portion of the diverter track remote from the contiguous radially extending beads.

In accordance with another aspect of the invention the outer surface of the diverter track is cammed over a certain portion of its periphery to sequentially engage one of several different length contact arms housed in a switch assembly secured to the valve body. The switch assembly includes a central contact arm normally in contact with the different length arms which in turn are sprung out of contact with the central contact as the different length arms ride on the especially configured cammed surfaces of the diverter track.

It is another object of the invention to provide a double-beaded portion of a channelled passageway in a diverter track in a vacuum control valve, which enables the use of larger vacuum communicating openings in an associated valve body surface heretofore not possible, which openings can be cored in the valve body to reduce the cost of the valve.

Another object of the invention is to provide a bead configuration in a diverter track in a vacuum control valve possessing discontinuous, radial bead surfaces over a portion of the track which provide a sufficiently uniform bead support surface to overcome cocking tendencies of the diverter plate and thus seal the valve from leakage therefrom.

Yet another object of the invention is to provide a vacuum control valve having an especially configured cammed surface on the exterior surface of a diverter track therein in association with a switch assembly secured to the body of the control valve, which arrangement possesses a greater number of switching combinations than heretofore available while also providing a positive acting, easily manufactured contact assembly.

The invention may take physical form in certain parts and arrangement of parts, a preferred embodiment of which will be described in detail herein and illustrated in the accompanying drawings which form a part hereof and wherein:

FIG. 2 is a cross-sectional view of the control valve taken along line 2—2 of FIG. 1;

FIG. 3 is a top view of the valve body of the vacuum control valve;

Figure 4:
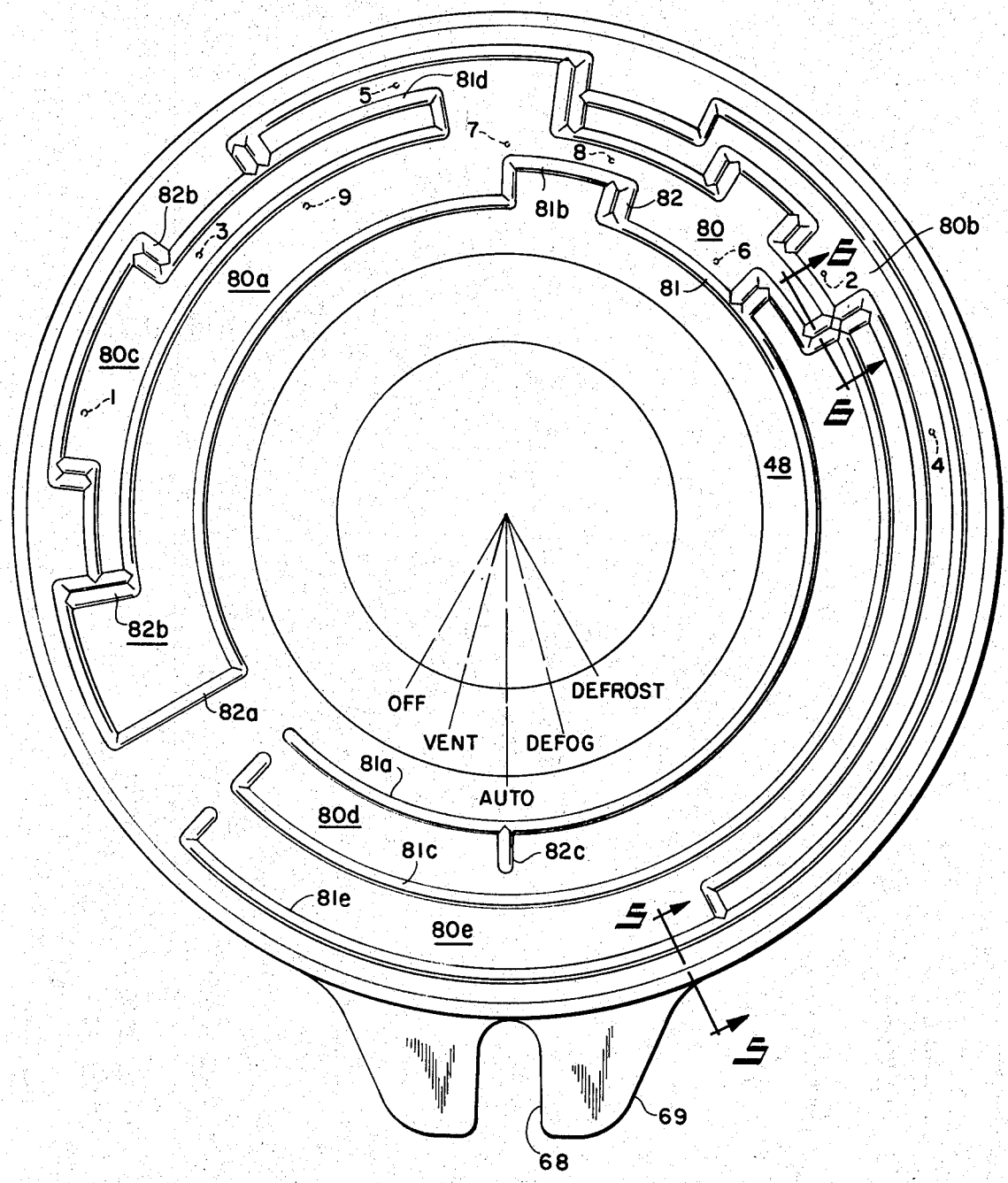
FIG. 4 is an elevation view of the molded face of the diverter track employed in the vacuum control valve.

FIGS. 5 and 6 are sectioned views of the beaded surfaces of the diverter track taken respectively along lines 5—5 and 6—6 of FIG. 4;

FIG. 7 is an elevation view of the top of the diverter track; and

FIG. 8 is a sectioned view of the diverter track taken along line 8—8 of FIG. 7.

Figure 1:
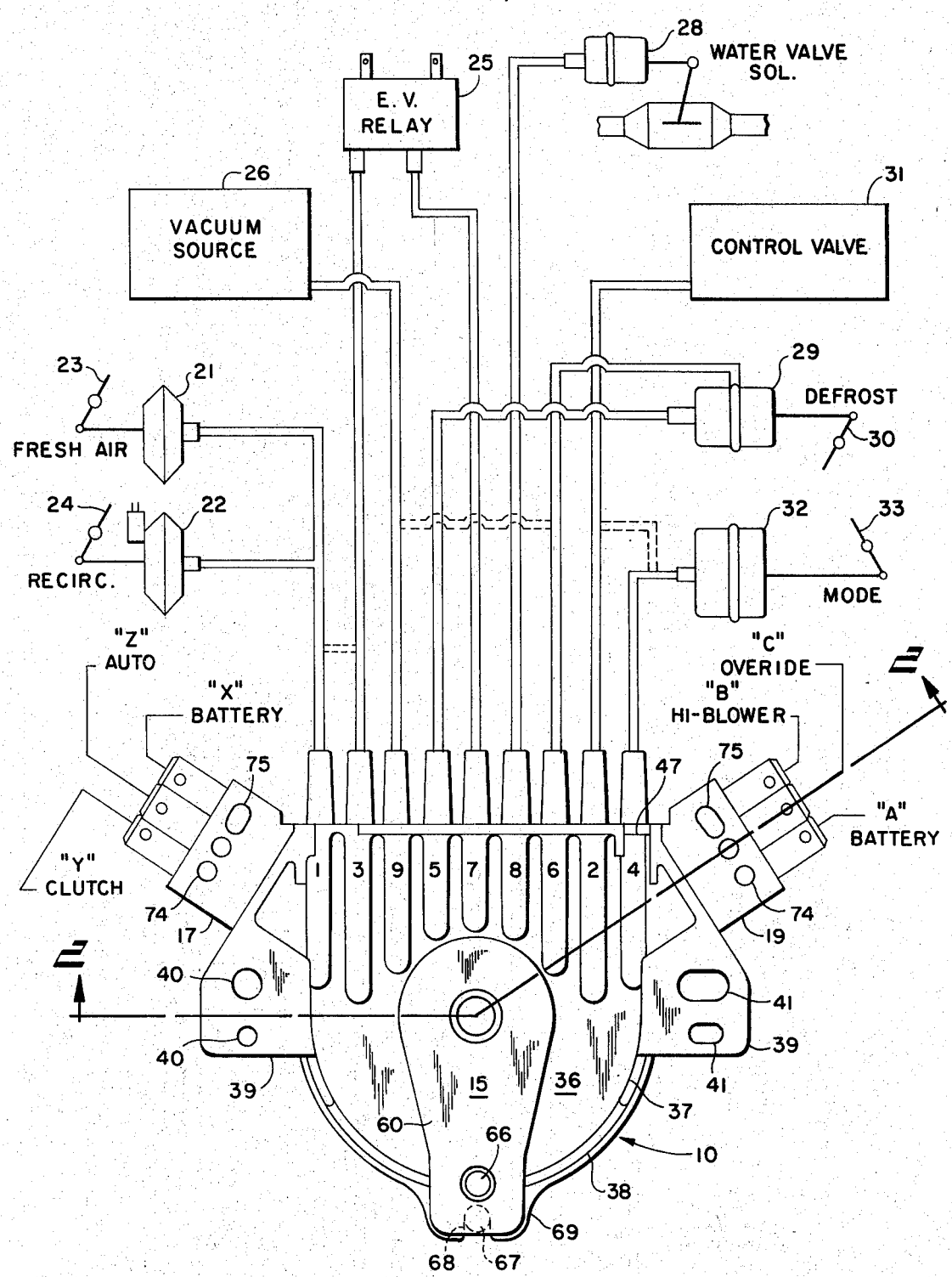
FIG. 1 is a bottom view of the vacuum control valve of the subject invention shown diagrammatically connected to its vacuum controlled accessories.

Referring now to the drawings wherein the showings are for the purpose of illustrating a preferred embodiment of the invention only and not for the purpose of limiting same there is shown in FIGS. 1 and 2, a vacuum control valve 10 comprising a valve body 12, a diverter track 14 abutting valve body 12, a detent ring member 15 extending through valve body 12 and diverter track 14 and a spring 16 at an end of ring member 15 to bias valve body 12 and diverter track 14 into contact with one another. First and second switch assemblies 17, 19 are secured to valve body 12 and extend over the diverter track 14 having first and second cammed projections 18, 20 (see FIG. 7) which actuate the switch assemblies 17, 19 respectively.

Valve body 12 has nine nipples extending therein, numbered 1 through 9, which are adapted to port vacuum in a manner known to those skilled in the art to several vacuum controlled accessories diagrammatically illustrated in FIG. 1. A more detailed explanation of the function and operation of such accessories than will be described herein may be had by reference to a co-pending application of Rudolph J. Franz entitled "Automotive Vehicle Automatic Temperature Control System," Ser. No. 238,838 and filed Mar. 28, 1972.

Briefly nipple 1 is connected to vacuum motors 21, 22 which in turn control the opening and closing of recirculating and fresh air doors 24, 23 respectively. Recirculating air door 24 effects recirculation of either heated or cooled air through the passenger compartment of the vehicle for maximum heating and cooling conditions. Fresh air door 23 accommodates the circulation of fresh air through the passenger compartment during heating or cooling of the passenger compartment.

Nipple 3 connects as a vacuum output to electro-vacuum relay 25 which in turn is connected to nipple 7 as a vacuum input thereto which remains constantly at source vacuum. Nipple 3 is adapted to communicate with nipple 1 to keep the fresh air door 23 closed and the system off until a specific coolant temperature is obtained as well as to keep the fresh air door closed when maximum cooling is required under automatic temperature control conditions.

Nipple 9 connects with source vacuum 26 and is in constant communication with nipples 7 and 8 (see FIG. 4). Nipple 8 is connected to a water valve solenoid 28 regulated by the automatic temperature control system which in turn is connected to a water valve (not shown) for controlling the water flow through a heater core (not shown).

Nipple 5 is connected to a defrost or a defog vacuum motor 29 which may be of the type having dual diaphragms in which one diaphragm moves a plunger a predetermined distance to move an air circulation door 30 operated by the plunger only one-half of its travel upon setting of the vacuum control valve 10 in a defog or partially defrost position. Vacuum motor 29 also has a second output connected with nipple 6 of the vacuum control valve to move the air circulation door 30 to its fullest defrost or deice position to send a maximum amount of hot air over the windshield and windows where provisions may be made by appropriate ducts to defrost the side windows as well as the rear window.

Nipple 2 is connected to an automatic temperature control valve 31 which supplies modulated vacuum thereto. Nipple 4 is connected to a vacuum motor 32 which in turn controls opening and closing of a mode door 33. When the vacuum control valve is in an automatic position, nipple 2 communicates with nipple 4 to supply a source of modulated vacuum to move mode door 33 from heating to bilevel to air conditioning and provide a continuous modulation with discharge air from floor to bilevel to the instrument panel in accordance with the requirements for heated or cooled air as determined by the automatic temperature control sensor.

Valve body 12 as shown in FIGS. 1, 2 and 3 includes a generally flat, circular top surface 35, a bottom surface 36, and a side surface flange 37 extending below the bottom surface which is recessed at the rear 38 of the valve body 12 so as to provide stops 34 for detent ring member 15. Extending outwardly from and at the bottom of flange 37 are diametrically opposed mounting surfaces 39 having rounded and slotted holes therein 40, 41 for mounting the valve in an adjustable manner. Contiguous with and extending upwardly from each mounting surface 39 is a stepped mounting base 42 for securing one of the switch assemblies 17, 19 thereto. Extending through the center of valve body 12 is an opening 43 which terminates at bossed end 44 on the bottom surface 36 of the valve body. Bossed end 44 is toothed 45 and adapted to mate with similar teeth on the detent ring member 15 to provide positive detent actuation means for the valve body. An annular groove 46 extends within the valve body 12 from the top surface 35 and encircles opening 43 at a spaced distance therefrom.

Extending from the front side 47 and adjacent the bottom surface 36 of the valve body are nipples 1 through 9, shown as formed tubes cast in the zinc die cast body 12. Each nipple communicates with an opening in the flat top surface 35 of the valve body, the openings also designated by numbers 1 through 9 indicating communication with correspondingly-numbered nipples. Openings 1 through 9 are shown (FIG. 3) as holes of approximately 0.045 inch to 0.047 inch diameter which may be cored in body 12.

Juxtaposed top flat surface 35 of valve body 12 is circular diverter track 14 having an end plate 48 abutting flat surface 35 which is molded to a bottom surface 49 of the diverter track. Depending from bottom surface 49 is an annular rib 50 which is adapted to fit within the annular groove 46 in the valve body permitting the diverter track to be pivoted for rotation relative to the flat surface 35 of valve body 12. Annular rib 50 encircles a central opening 51 extending from the bottom surface 49 to a top surface 52 of the diverter track.

Top surface 52 of diverter track 14 includes an annular rib 53 spaced from and encircling opening 51 which is adapted to maintain the telescoping spring 16 in a central position. Extending radially from the annular rib 53 to the periphery of the top surface 52 are first and second raised cammed surfaces 18, 20 adapted to actuate switch assemblies 17, 19 respectively. Each cammed surface is defined by a generally flat, raised, circumferentially extending surface 54 having radially-tapering end surfaces 55 blending into top surface 52. First cammed surface 18 has a circumferentially extending surface 54 which extends to the periphery of diverter track 14. The second cammed surface 20 has a circumferentially extending surface 54 with a circumferentially extending recess 56 therein adjacent the periphery of the diverter track and extending midway the radial length of surface 54. Recess 56 blends into surface 54 by tapered, radially-extending end surfaces 57.

The valve body 12 and diverter track 14 are maintained in their assembled position by detent ring member 15 which has a flat base surface 60 adjacent the bottom surface 36 of the valve body 12 from which extends a post 61 passing through central openings 43, 51 in the valve body and diverter track. Affixed to the top of the post at its end 62 is a washer 63 which serves as a stop for telescoping spring 16. Spring 16 is thus compressed between washer 63 and top surface 52 of the diverter track 14 to bias the end plate 48 of the diverter track and the flat top surface 35 of the valve body into abutting engagement with one another. An inner bossed surface 64 of the flat base 60 adjacent the bossed end 44 of the valve body 12 has detent teeth 65 formed thereon to coact with detent teeth 45 on bossed end 44 to provide five separate detent controlled valve positions shown as "defrost," "defog," "automatic," "vent" and "off" (see FIGS. 3 and 4). More particularly, a positive detent action is assured by providing three detent teeth 65 circumferentially spaced in equal increments about the inner surface 64 each of which contacts a series of six detent teeth likewise circumferentially spaced about the bossed end 44. Such detent arrangement assures a uniform loading on the base surface 60 of the detent ring member 15 which in turn minimizes any cocking tendency of the post 61 within openings 43, 51.

Extending from the base surface 60 of the detent ring member 15 is a first actuating post 66 (see FIG. 1) which is connected by suitable means (not shown) to the console in the passenger compartment whereby detent ring member 15 is rotated. A second actuating post 67 (FIG. 1) extends oppositely to post 66 through an elongated slot 68 formed in a protrusion 69 (FIG. 7) extending from the rear of the diverter track 14 whereby rotation of ring member 15 controls the position of diverter track 14 with respect to the flat top surface 35 of the valve body. Importantly slot 68 is sized greater than the diameter of the second actuating post 67 to permit post 67 a limited degree of free movement before contacting and rotating the diverter track 14. This free movement corresponds to the travel of the ring member's detent teeth 65 relative to the valve body's detent teeth 45 before the crests of coacting detent teeth contact one another. In this manner, control valve 10 provides positive "feel" or "touch" to the vehicle operator which assures him that control valve 10 is accurately placed in one of its selected positions.

referring now to FIGS. 1 and 2, there is shown a switch arrangement for controlling electrical functions associated with the vacuum controlled accessories regulated by the control valve 10. This arrangement comprises the cammed surfaces 18, 20 in the top of the diverter track 14 as described above and their associated switch assemblies 17, 19. Switch assembly 17 includes three terminals identified as X, Y nad Z, the X terminal connected to line voltage, the Y terminal connected to electrically actuated clutch means whereby the air conditioner compressor is actuated and the Z terminal connected to an automatic programmer controlling blower speed when control valve 10 is in its automatic position. Switch assembly 19 likewise includes three terminals identified as A, B and C, terminal A connected to line voltage, terminal B connected to the blower motor to actuate high speed operation thereof and terminal C connected to electro-vacuum relay 25 in such a manner as to override same so that the fresh air door 23 remains in an open position.

Both switch assemblies 17, 19 are identical in construction and description of switch assembly 17 will likewise be applicable to a description of switch assembly 19. First switch assembly 17 includes a dielectric spring block 71 secured at its bottom to the mounting base 42 extending outwardly from valve body 12 and a dielectric shroud 73 which is secured at its end to the top of the spring block and extends inwardly over the cammed projection 18. More particularly spring block 71 is secured to the base 42 and shroud 73 by being staked through openings 74, 75 in the base 42 and similar openings (not shown) in shroud 73. Additionally, a rivet 76 extending through shroud 73, spring block 71, and base 42 rigidly secures switch assembly 17 to valve body 12.

Extending through spring block 71 at a top end 72 thereof and about the top stakes are contact arms Y, Z. The top end 72 of spring block 71 which receives contact arms Y, Z is cut with a tapering recess which mates with a tapering tongue surface (not shown) in a shroud 73 so that when arms X, Y are assembled therein they are biased or cantilevered downwardly in a normal position. Extending through spring block 71 adjacent the bottom thereof is relatively rigid contact arm Z which does not extend over the diverter track 14 and is formed to extend upwardly so that its contact point 77 normally engages contact points 78 on arms Y, Z to complete appropriate circuits therethrough. When contact arms Y, Z engage radial flat surfaces 52 on cammed projection 18, contact points 77, 78 are sprung open. Importantly contact arms Y, Z are of different lengths extending inwardly to contact different portions of the radial flat surfaces 52 of cammed projection 18. With respect to the second contact arm assembly 19 the shorter length contact arm in conjunction with recess 56 in cammed projection 20 enables the shorter arm to be actuated independently of the longer length contact arm to thus provide a greater combination of switching circuits than heretofore possible.

Referring now to FIGS. 4, 5, 6 and 8, where is shown in detail the construction of the end plate 48 of the diverter track 12 which provides sealing means for the valve 10. End plate 48 is preferably constructed of neoprene rubber of approximately 40 durometer hardness which is molded to the bottom surface 49 of the diverter track. End plate 48 essentially comprises a plurality of channelled diverter passageways 80 formed by contiguous, circumferentially extending and radially extending raised bead surfaces 81, 82. The number of channelled diverter passageways 80 is determined by the number of different vacuums which must be supplied to the vacuum controlled accessories and this number plus the number of total devices controlled by such vacuums determines the number of circumferentially extending and radially extending bead surfaces 81, 82.

In the diverter track 14 illustrated in the preferred embodiment shown in FIG. 4, which also illustrates vacuum inlet and outlet openings 1 through 9 superimposed thereon with the valve 10 in an automatic position. there are five passageways 80a–80e, 80a being at source vacuum, 80b at modulated vacuum, 80c at an electro-vacuum relay vacuum, and 80d, 80e vented to atmosphere. Similarly there are five discontinuous, concentric, circumferentially extending raised bead surfaces identified as 81a–81e, any combination of any two of which may define inner and outer edges of a channelled passageway 80. For example channelled passageway 80a has inner and outer edges defined by circumferentially extending bead surfaces 81a–81e, 81a–81c, 81d–81e, 81b–81c and 81a–81d. Similarly each channelled diverter passageway 80 may have a number of channelled ends defined by radially extending bead surfaces 82, which may be of a single bead construction 82a, which occurs when none of the vacuum openings 1 through 9 pass thereacross, or the radially extending bead surface may be of a double-bead construction 82b which occurs whenever a radially extending bead surface must traverse a vacuum opening during rotation of the diverter track 14. Additionally there are radially extending bead surfaces 82c which do not connect with the inner and outer edges of passageways 80 such as those shown at passageways 80d and 80e which are vented to atmosphere or that shown between beads 81a–81e. Importantly radial beads 82c are located in that portion of the end plate 48 which is remote from the end face portion containing the majority of radial bead surfaces 82a, 82b to thus provide a more uniform bead density about the end plate 48. This promotes sealing about the entire end plate 48 even though rotation of detent ring member 15 through the first actuating post 66 may exert a couple tending to unevenly depress spring 16.

Each bead surface is constructed of essentially the same cross-sectional configuration illustrated in FIG. 5 which is defined by outwardly-tapered side surfaces 85 at an angle of approximately 15° to the axial centerline 86 of the bead which surfaces are blended into one another at the top of the bead by a smooth radius 87. This configuration has been found to exhibit excellent sealing and wear characteristics. The double, radially extending bead surfaces 82b are essentially comprised of two single radially extending bead surfaces placed side by side as shown in FIG. 6. Importantly the circumferential width of any double, radial bead surface 82b is constant and in the embodiment illustrated is approximately 2° between axial centerlines 86. This width in conjunction with the freedom of movement between the detent teeth 45, 65 in the valve body 12 as explained above assures sealing of all vacuum openings until mating detent teeth 45, 65 have passed their respective high contact points thereby assuring positive indexing action to the next valve position.

In operating the vehicle operator will rotate the first actuating post 66 by some suitable means in the passenger console to rotate the diverter track relative to the valve body to one of the valves selected positions. During this rotation certain channelled diverter passageways 80 will pass over certain vacuum openings 1 through 9 to port the openings to different vacuums or atmospheres in other channelled diverter passageways. Simultaneously different contact arms in the switch assemblies 17, 19 will open and close various circuits to satisfy the new operating mode required. For ease of explanation, such sequences are shown in the table set forth below:

| NIPPLE | OFF | VENT | DETENT POSITIONS AUTO | DEFOG | DEFROST |
|---|---|---|---|---|---|
| 1 | X | vented | to 3 | to 3 | vented |
| 2 | to 4 | X | to 4 | vented | vented |
| 3 | seal | seal | to 1 | to 1 | seal |
| 4 | to 2 | seal | to 2 | seal | seal |
| 5 | vented | X | X | X | vented |
| 6 | vented | X | X | vented | vented |
| 7 | X | X | X | X | X |
| 8 | X | X | X | X | X |
| 9 | X | X | X | X | X |
| | | | TERMINAL CONNECTIONS | | |
| | none | X-Z | X-Y-Z | X-Y-Z | X-Y-Z |
| | none | A-C | none | A-C | A-B-C |

X - indicates source vacuum.

Having thus described our invention, it is apparent that many modifications may be made thereto without departing from the spirit or essence of the invention. For example, only double-beaded, radially extending surfaces 82b have been employed because switching is accomplished by rotation of the diverter track with openings 1 through 9 positioned midway between inner and outer circumferentially extending edge surfaces of diverter passageways. If switching was to occur by axial movement of the track relative the valve body so as to cut across circumferentially extending bead surfaces, then a double bead surface would be employed therewith. It is our intention to include all such modifications and alterations insofar as they come within the scope of the present invention.

It is thus the essence of our invention to provide an improved, pressure-operated control valve employing positive sealing means therein which includes especially configured, molded passageways and means to port pressure from one passageway to the other.

Having thus defined our invention, we claim:

1. A vacuum control valve comprising:
   a valve body having at least a vacuum inlet and a vacuum outlet leading therein, a generally flat surface having openings extending therein, said inlet communicating with one of said openings and said outlet communicating with the other opening;
   a diverter track mounted for relative rotation with respect to said flat surface and having an end plate abutting said flat surface, said plate having two channelled diverter passageways formed therein, at least one passageway communicating with at least one of said openings,
   means for pressuring one of said passageways at a first pressure and the other at a second pressure in one position of said valve,
   each channelled diverter passageway further defined by contiguous circumferentially extending and radially extending bead surfaces, said circumferentially extending bead surfaces defining inner and outer edges of said passageways and said radially extending bead surfaces defining end edges of said passageways, and one of said passageway end edges further defined by first and second radially extending substantially parallel bead surfaces contiguous along their entire length and forming a double bead extending between said circumferential bead surfaces.

2. The vacuum control valve of claim 1 further including a plurality of vacuum inlets and outlets, a plurality of openings, each inlet and outlet communicating with a particular opening and a plurality of channelled passageways, including a first closed passageway at source vacuum, a second closed passageway at modulated vacuum and a third opened passageway at atmosphere, means for rotating said diverter plate relative said valve body to move selective passageways from communication with one opening to another, and said first and second radial bead surfaces positioned at each passageway end which is adapted to traverse an opening during actuation of said rotating means.

3. The vacuum control valve of claim 2 wherein each bead surface has a cross-sectional configuration defined by sidewalls tapering inwardly from the base thereof and a curvilinear surface at the top thereof blending into said sidewalls.

4. The vacuum control valve of claim 3 wherein each pair of first and second radial bead surfaces have a predetermined width between axially extending centerlines of constant arcuate dimension.

5. The vacuum control valve of claim 4 wherein said openings are cored in said valve body.

6. The vacuum control valve of claim 4 wherein certain channelled passageways have a discontinuous, third radially extending bead surface.

7. A control valve for porting pressure to pressure controlled accessories and controlling electric current flow to operate devices functionally associated with said accessories, said control valve comprising:

a valve body having a generally flat surface and a plurality of openings extending therethrough, a vacuum inlet communicating with one of said openings and at least two vacuum outlets communicating with other particular openings;

a diverter track having an end plate abutting said generally flat surface, said plate having at least two channelled diverter passageways communicating with said openings;

spring means biasing said flat face of said valve body and said end plate of said diverter track member together;

actuating means to rotate said diverter track relative said flat surface to port at least one opening from one passageway to the other;

switch assembly means carried on said valve body for controlling said current, said switch means including different length contact arms; and cam means on the side of said diverter track opposite said end plate for sequentially engaging said contact arms to actuate said switch means as said diverter track rotates relative said body and further including a raised, circumferentially extending generally flat face surface extending radially over a portion of said diverter track and radially extending end surfaces tapering downwardly to the top surface of said diverter track, said generally flat circumferentially extending surface having a circumferentially extending recess therein extending radially from the outer periphery of said diverter track to a point intermediate the radial length of said circumferentially extending surface, and said different length contact arms include a first contact arm extending over said circumferentially extending flat surface over its radially inner portion and a second shorter length contact arm extending over said circumferentially extending flat surface at its outer peripheral portion.

8. The control valve of claim 7, wherein said actuating means includes a protuberance extending outwardly from said diverter track and having a slotted opening therein, a detent, rotatable ring member having an actuating post thereon, said post extending within said slot and having a predetermined clearance therebetween, selective channelled diverter passageways having certain portions of their peripheries defined by first and second, adjacent bead surfaces, and sealing means preventing loss of pressure in said passageways when said valve is operated, said sealing means including the distance between centers of said first and second bead surfaces and said clearance between said slot and post.

9. The control valve of claim 8, wherein said valve body has a bottom surface, a central opening extending through said body between said generally flat and bottom surfaces, a bossed surface depending from said bottom surface and encircling said central opening, a first, second, and third plurality of detent teeth circumferentially spaced about said bossed surface, each plurality comprising a number of detent teeth which is one greater than the number of operating positions of said valve, said diverter track having a central opening extending therethrough, said ring member having a second actuating post extending through said central openings of said body and said diverter track, and an underside surface about said second actuating post, said underside surface having a detent tooth extending therefrom for each plurality of detent teeth on said bossed surface.

10. The control valve of claim 9, wherein said diverter track has first annular rib depending from its bottom surface, and a second annular rib extending from its top surface, said first and second ribs spaced from said central opening in said diverter track, said generally flat surface of said valve body having an annular groove formed therein, said groove spaced from said central opening in said body and receiving said annular first annular rib whereby said diverter track is guided in its rotation relative said flat surface of said valve body, and said spring means including a telescoping spring within said second rib, a washer secured to the top of said post, said spring being precompressed between said washer and said top surface of said diverter track.

* * * * *

UNITED STATES PATENT OFFICE
CERTIFICATE OF CORRECTION

Patent No. 3,856,045      Dated December 24, 1974

Inventor(s) Andrew A. Kenny; Richard K. Larson; Donald F. Janous

It is certified that error appears in the above-identified patent and that said Letters Patent are hereby corrected as shown below:

In the Abstract, line 7:     Before "a" insert ---and---.

Col. 1, line 5:     "positive means of pressure sealing therein" should properly read ---positive pressure sealing means therein---.

Col. 6, line 1:     "referring" should read ---Referring---.

Col. 6, line 8:     "nad" should read ---and---.

Col. 7, line 15:     There should be a comma (,) before the word "there".

Signed and Sealed this fifth Day of August 1975

[SEAL]

Attest:

RUTH C. MASON  
*Attesting Officer*

C. MARSHALL DANN  
*Commissioner of Patents and Trademarks*